United States Patent [19]
Onozawa et al.

[11] Patent Number: 5,445,405
[45] Date of Patent: Aug. 29, 1995

[54] SUSPENSION CONTROL APPARATUS

[75] Inventors: Satoru Onozawa, Anjo; Naoki Yamada, Aichi; Shigetaka Isogai, Chiryu; Kazuo Ogawa, Toyota, all of Japan

[73] Assignees: Aisin Seiki Kabushiki Kaisha, Kariya; Toyota Jidosha Kabushiki Kaisha, Toyota, both of Japan

[21] Appl. No.: 229,747

[22] Filed: Apr. 19, 1994

[30]     Foreign Application Priority Data

Apr. 20, 1993 [JP] Japan ................................. 5-117741

[51] Int. Cl.⁶ .......................................... B60G 17/015
[52] U.S. Cl. .................................. 280/707; 364/424.05
[58] Field of Search ................. 280/707, 840, DIG. 1; 364/424.05

[56]               References Cited
          U.S. PATENT DOCUMENTS

| | | | |
|---|---|---|---|
| 5,289,380 | 2/1994 | Kimura | 280/707 X |
| 5,322,320 | 6/1994 | Sahashi et al. | 280/707 |
| 5,328,202 | 7/1994 | Kakizaki | 280/707 |

FOREIGN PATENT DOCUMENTS

| | | |
|---|---|---|
| 4-15113 | 1/1982 | Japan . |
| 3-276807 | 12/1991 | Japan . |
| 3-276808 | 12/1991 | Japan . |

*Primary Examiner*—Josie A. Ballato
*Attorney, Agent, or Firm*—Burns, Doane, Swecker & Mathis

[57]                 ABSTRACT

A suspension control apparatus comprises a sprung velocity measuring device for measuring a sprung velocity, a relative velocity measuring device for measuring a relative velocity between the sprung and unsprung velocities, a controller for mode-converting, weighting and inversely mode-converting the sprung velocity and relative velocity, and having a dead zone setting circuit for changing over a control value when the polarity of the velocity difference is inverted at a first time, in order to calculate a velocity ratio and determine a target damping force, and an actuator for controlling the opening area in the variable throttle mechanism communicating with the cylinder piston apparatus of absorber was disclosed. The suspension control apparatus has the effect that there is no delay in controlling and any shock and the generation of hunting is prevented.

25 Claims, 13 Drawing Sheets

F I G. 6
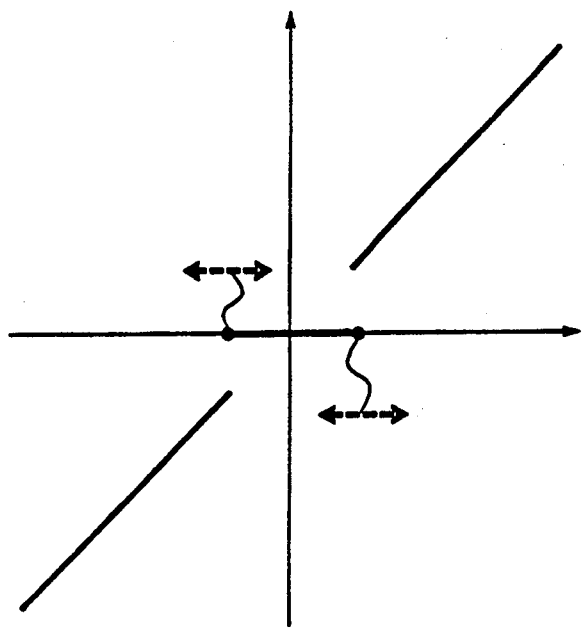

SUSPENSION CONTROL APPARATUS

BACKGROUND OF THE INVENTION

1. Field of the Invention

The present invention relates to a suspension control apparatus having a dead zone setting circuit which can be switched to an inverted code control value when the polarity of an input signal is inverted within the dead zone at a first time.

2. Description of the Prior Art

A prior art suspension control apparatus has a dead zone setting circuit for maintaining a prior constant value before reaching a boundary value of a dead zone thereof after the polarity of an input signal is inverted as shown in FIG. 13, and then for switching to a constant value having different polarity from each other after reaching the boundary value.

In the prior art suspension control apparatus described above, when an input signal as shown in FIG. 8(A) is generated, it is changed over to a constant value with a different polarity at a boundary zone of its dead zone as indicated by dashed line in FIG. 8(D). Therefore, there has been such a problem that a delay in control is generated and a control value at the boundary zone of the dead zone is drastically changed, resulting in the generation of a shock. Then, in the case of canceling the dead zone, there is such a problem that the control value is hunting when its input value frequently varies in positive and negative polarities around zero point.

SUMMARY OF THE INVENTION

It is an object of the present invention to provide a suspension control apparatus in which any delay in sky hook control is prevented.

Another object of the present invention is to provide a suspension control apparatus in which the generation of any shock is prevented.

A further object of the present invention is to provide a suspension control apparatus in which any hunting is prevented.

A still further object of the present invention is to provide a suspension control apparatus which bases on such a technical idea that its control value should be changed over when the polarity of an input signal is inverted at a first time within a dead zone thereof.

A yet further object of the present invention is to provide a suspension control apparatus, which is disposed between a wheel support member and a vehicle body and controls any damping force in accordance with its driving quantity, comprising: a sprung velocity measurement means for measuring a sprung velocity of a portion above a spring; a relative velocity measurement means for measuring relative velocities between portions above and under the spring; and a controller having a first dead zone setting circuit for setting a dead zone by changing over a control value when at least the polarity of the input signal of the relative velocity is inverted at a first time and for calculating a velocity ratio of the sprung velocity vs the relative velocity when the dead zone is set.

A yet further object of the present invention is to provide a suspension control apparatus comprising a sprung velocity measuring means having acceleration sensors for detecting accelerations in the vertical direction of a member above a spring and for measuring a sprung velocity; a relative velocity measuring means having displacement sensors detecting amounts of displacements in the vertical direction of said member above said spring and for measuring a relative velocity between members above and under said spring; a controller for mode-converting the sprung velocity and the relative velocity and inversely mode-converting the mode-converted sprung velocity; discriminating a road surface condition while travailing, controlling a sprung velocity inversely mode-converted depending upon the discriminated road surface condition and a velocity difference between the sprung velocity and the relative velocity, providing a dead zone setting circuits and switching a control value when the polarity of the velocity difference is inverted at a first time, calculating a ratio between the sprung velocity and the velocity difference to obtain a velocity ratio and generating a control signal determining a target damping force; and An actuator for controlling the opening area of a variable throttle mechanism disposed between a cylinder piston apparatus of an absorber in the suspension mechanism and an accumulator based on the control signal.

A further object of the present invention is to provide a suspension control apparatus including the controller comprising a first mode-converting circuit for mode-converting the sprung velocity and inversely mode-converting the mode-converted sprung velocity; a second mode-converting circuit for mode-converting the relative velocity and inversely mode-converting the mode-converted relative velocity; a first dead zone setting circuit for setting a dead zone in the sprung velocity receiving an inverse mode conversion generated from the first mode-converting circuit; a second dead zone setting circuit for setting a dead zone in the velocity difference between the relative velocity and the sprung velocity receiving an inverted mode conversion generated from the first and second mode-converting circuits; a road surface condition discriminating circuit for discriminating a road surface condition driven on the basis of the second mode-converting circuit and generating a signal controlling the dead zone width of the first and second dead zone setting circuits; a velocity ratio circuit for calculating a target damping force by dividing a sprung velocity each controlled depending upon the road surface condition in terms of the width of a dead zone by a velocity difference between the sprung velocity and the relative velocity; a gain circuit for adjusting a sky hook gain determining a target damping force depending upon the road surface condition based on the output of the road surface condition discriminating circuit; a vehicle speed circuit for generating a stepwise target damping force depending upon the vehicle speed signal from a vehicle speed sensor 5; and a maximum value circuit for generating the larger target damping force selected from a target damping force on the basis of the adjusted velocity ratio in sky hook gain generated from the gain circuit and a target damping force generated from the vehicle speed circuit.

The suspension control apparatus of the invention is used so that a dead zone setting circuit switches a plus control value to a minus control value when the polarity of a relative velocity measured by the relative velocity measuring means is inverted from its plus polarity to its minus polarity within the dead zone and a velocity ratio of the sprung velocity vs a relative velocity when this dead zone is set.

The suspension control apparatus of this invention having the action described above has such effects that there is no delay in controlling and the generation of shock and hunting is prevented.

BRIEF DESCRIPTION OF THE DRAWINGS

FIG. 6 is a diagrammatic view showing a dead zone of a sprung velocity;

DETAILED DESCRIPTION OF PREFERRED EMBODIMENTS

Figure 1:
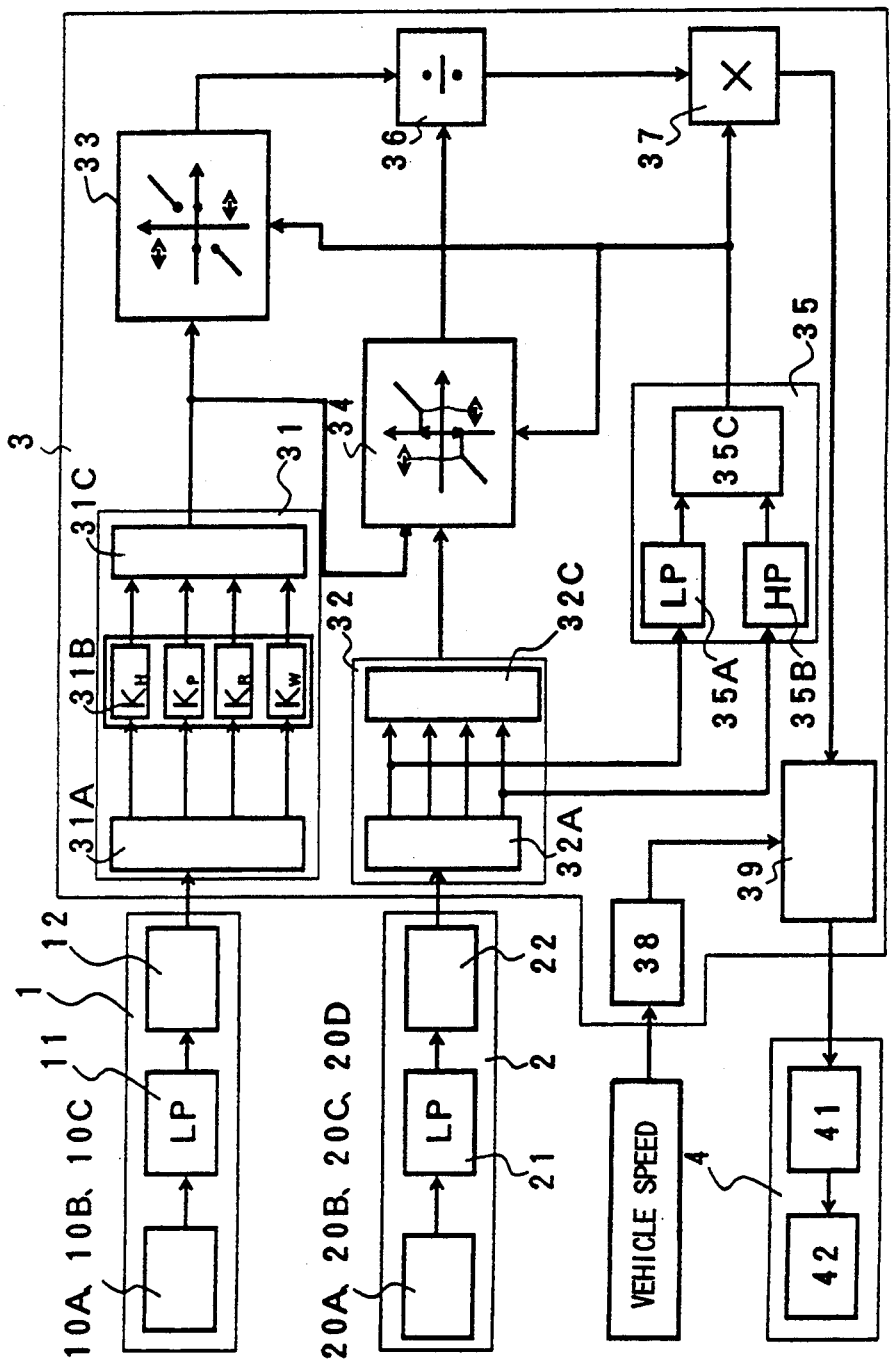
FIG. 1 is a block diagram showing a suspension control apparatus as a first preferred embodiment of the present invention.

Referring now to the drawings, the detailed description of a suspension control apparatus as a preferred embodiment of the invention will be given in the following.

(First Preferred Embodiment)

Figure 11:
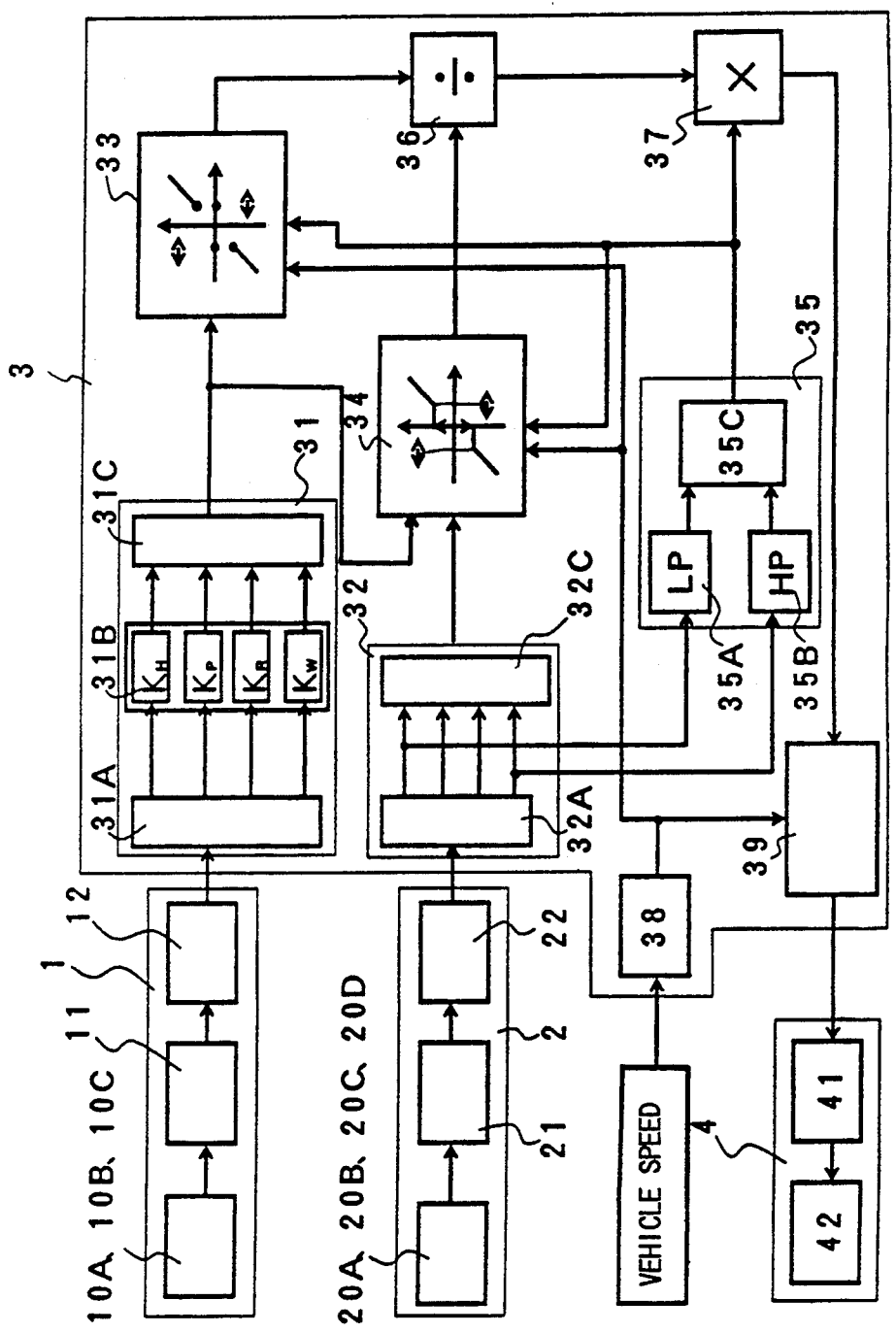
FIG. 11 is a block diagram showing a suspension control apparatus as a second preferred embodiment of the present invention.

The suspension control apparatus of the first preferred embodiment is used for carrying out a sky hook control and as shown in FIG. 1 or 11, it comprises a sprung velocity measuring means 1 having acceleration sensors 10A through 10C detecting acceleration Z1 through Z3 in the vertical direction of a member above a spring and for measuring a sprung velocity; a relative velocity measuring means 2 having displacement sensors 20 detecting amounts of displacements Y1 through Y4 in the vertical direction of said member above said spring and for measuring a relative velocity between members above and under said spring; a controller 3 for mode-converting the sprung velocity and the relative velocity and inversely mode-converting the sprung velocity mode-converted; discriminating a road surface condition while traveling, controlling a sprung velocity inversely mode-converted depending upon the discriminated road surface condition and a velocity difference between the sprung velocity and the relative velocity, providing a dead zone setting circuits 33 and 34 switching a control value when the polarity of the velocity difference is inverted at a first time, calculating a ratio between the sprung velocity and the velocity difference to obtain a velocity ratio and generating a control signal determining a target damping force; and an actuator 4 for controlling the opening area of a variable throttle mechanism 53 disposed between a cylinder piston apparatus 51 of an absorber 50 in the suspension mechanism and an accumulator 52 based on the control signal.

Figure 2:
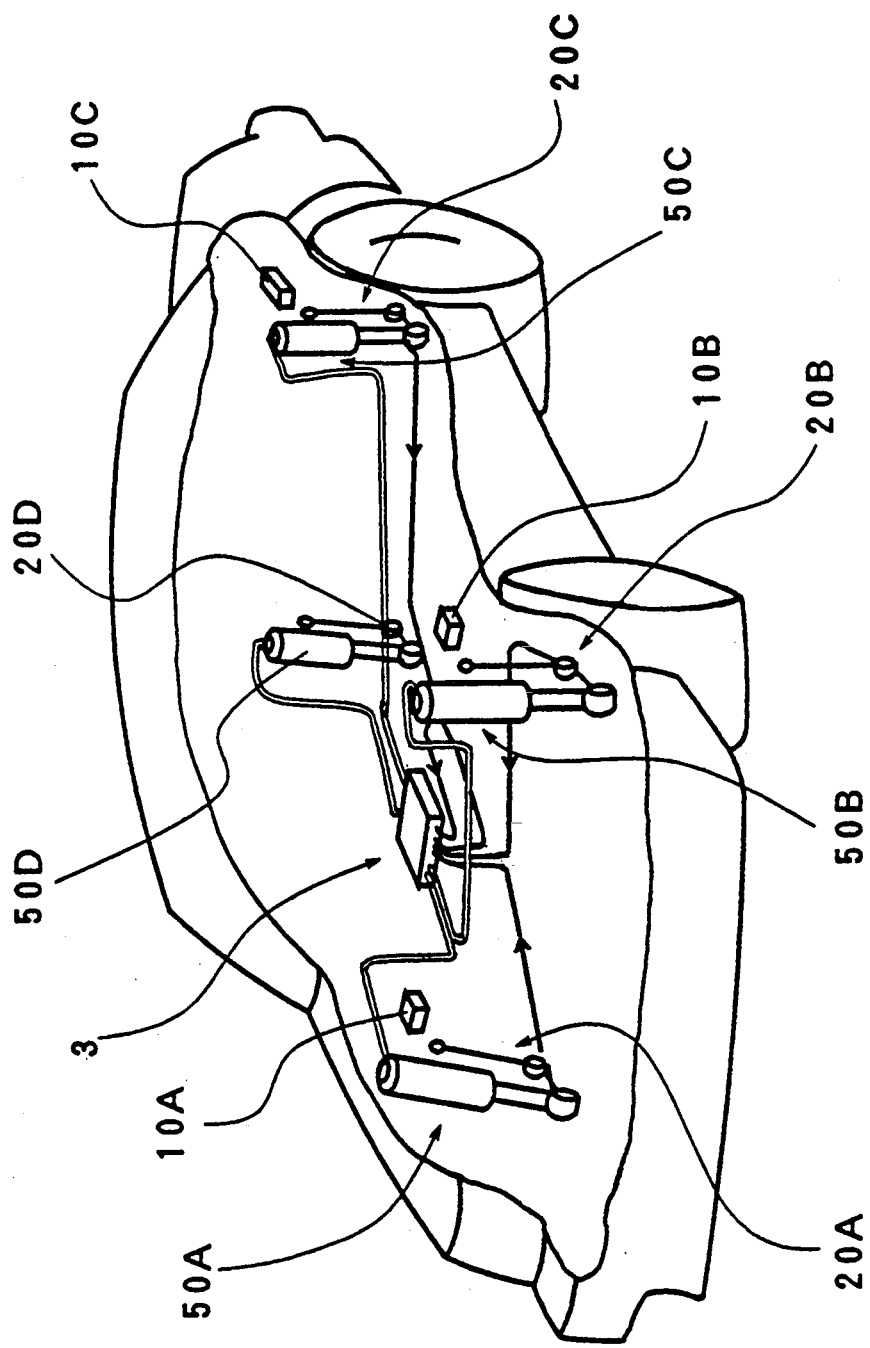
FIG. 2 is a perspective side view showing an arrangement mode in the vehicle of the apparatus in the first preferred embodiment.

The sprung velocity measuring means 1 comprises acceleration sensors 10A, 10B and 10C provided respectively in sprung members (not illustrated) at the right and left front and left rear wheels as shown in FIG. 2; a low pass filter 11 for generating only the components having the frequencies not exceeding 20 Hz from the acceleration signals detected by each acceleration sensor; and an integrator 12 for generating a sprung velocity from the integration of the acceleration signals from the low pass filter.

Figure 4:
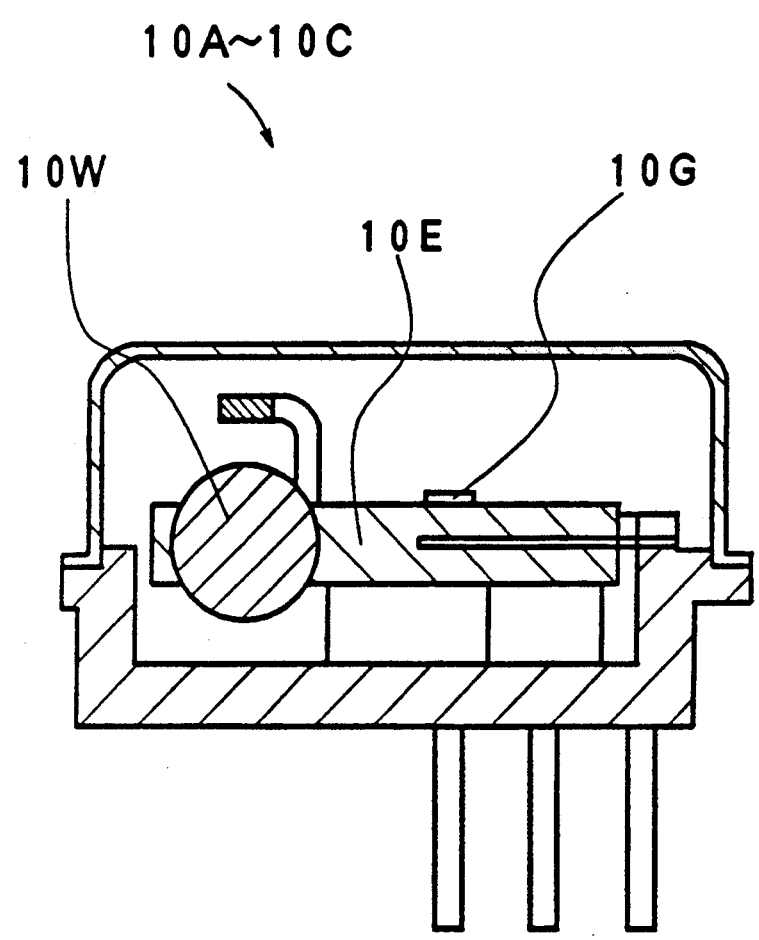
FIG. 4 is a sectional view showing an acceleration sensor in the apparatus of the first preferred embodiment.

Each of the acceleration sensors 10A, 10B and 10C is employed by generating an electric signal corresponded to a stress accompanied by the motion of a weight 10W depending on the acceleration applied by a strain gauge 10G adhered to a portion close to one end of a vibrating piece 10E in a cantilever structure whose one end is fixed to a base as shown in FIG. 4. The acceleration sensors comprise such a constitution that one piece of sensor is omitted by assuming the acceleration of the right rear wheel from the acceleration signals of the sensors 10A and 10B for the right and left front wheels and the left rear wheel.

The relative velocity measuring means 2 comprises displacement sensors 20A through 20D respectively comprising both the sprung member of each wheel and the potentiometer interposed between the sprung and unsprung members for wheels; a low pass filter 21 for generating only components having frequencies not exceeding 20 Hz from the displacement signals each displacement sensor detected; and a differentiator 22 for generating a relative velocity by differentiating the increment every a constant time of the displacement signal generated by the low pass filter 21.

Figure 5:
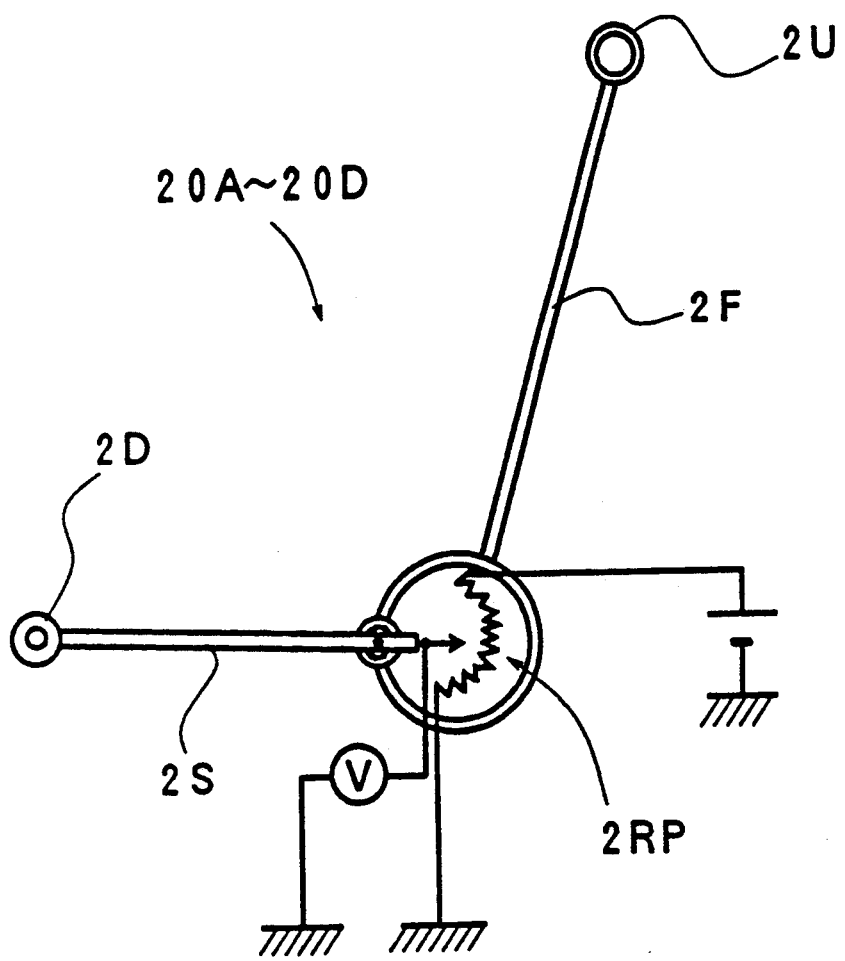
FIG. 5 is a skeleton diagram showing simply a displacement sensor in the apparatus of the first preferred embodiment.

As shown in FIG. 5 in a model form, each of the displacement sensors 20A through 20D comprises a first member 2F fixed at a top end 2U thereof to the sprung member, a second member 2S fixed at a bottom end 2D to the sprung member, and a rotary type potentiometer 2RP disposed between the first member 2F and the second member 2S, and when the interval between the sprung and unsprung members is varied, an angular relation between the first member 2F and the second member 2S is varied and the contact position of the potentiometer is varied, thereby to generate the relative displacement as a voltage signal.

The controller 3 comprises a first mode-converting circuit 31 for mode-converting the sprung velocity and inversely mode-converting the mode-converted sprung velocity; a second mode-converting circuit 32 for mode-converting the relative velocity and inversely mode-converting the mode-converted relative velocity; a first dead zone setting circuit 33 for setting a dead zone in the sprung velocity receiving an inverse mode conversion generated from the first mode conversion circuit 31; a second dead zone setting circuit 34 for setting a dead zone in the velocity difference between the relative velocity and the sprung velocity receiving an inverted mode conversion generated from the first and second mode-converting circuits 31 and 32; a road surface condition discriminating circuit 35 for discriminating a road surface condition driven on the basis of the second mode-converting circuit 32 and generating a signal controlling the dead zone width of the first and second dead zone setting circuits; a velocity ratio circuit 36 for calculating a target damping force by dividing a sprung velocity each controlled depending upon the road surface condition in terms of the width of a dead zone by a velocity difference between the sprung velocity and the relative velocity; a gain circuit 37 for adjusting a sky hook gain determining a target damping force depending upon the road surface condition based on the output of the road surface condition discriminating circuit 35; a vehicle speed circuit 38 for generating a stepwise target damping force depending upon the vehicle speed signal from a vehicle speed sensor 5; and a maximum value circuit 39 for generating the larger target damping force selected from a target damping force on the basis of the adjusted velocity ratio in sky hook gain generated from the gain circuit 37 and a target damping force generated from the vehicle speed circuit 38.

The first mode-converting circuit 31 is employed to mode-convert of the sprung velocity into each mode component of heave, pitch, roll or warp by a mode-converting circuit 31A, add some proper weighted $K_H$, $K_P$, $K_R$ and $K_W$ to each mode by a weighting circuit 31B, and then inversely mode-converts each mode component of heave, pitch, roll or warp each weighted heave, pitch, roll or warp by an inverted mode-converting circuit 31C to generate a weighted sprung velocity.

The second mode-converting circuit 32 is employed to mode-convert of the relative velocity into each mode component of heave, pitch, roll or warp by a mode-converting circuit 32A, add a proper weight to each mode component in a manner similar to the case described for the first mode conversion circuit, and then inversely convert each mode component of heave, pitch, roll or warp each weighted by an inverted mode-converting circuit 32C to generate a weighted relative velocity. Incidentally, it is also possible to give such a mode that no weighting is carried out in the present second mode-converting circuit 32, although a weighted example was shown in this preferred embodiment.

The road surface condition discriminating circuit 35 comprises a low pass filter 35A for generating components having their frequencies not exceeding 3 Hz from the warp mode components of the relative velocities generated by the mode-converting circuit 32A in the second mode-converting circuit; a highpass filter 35B for generating the component shaving the frequencies of 3 Hz or more from the warp mode components of the relative velocities generated by the mode-converting circuit 32A described above; and a discriminating circuit 35C for discriminating the count number respectively, e.g., bad road in the case of 0 time, good road in the case of 1 time, complex road in the case of 2 times, zigzagged road in the case of 3 times and generating a signal controlling a dead zone width and a sky hook gain signal by counting the times when the set threshold level is exceeded.

The first dead zone setting circuit 33 is employed to set such a dead zone as to take a value of zero within the dead zone having a width controlled by road surface conditions, vehicle speeds, etc., in the weighted sprung velocity generated from the first mode-converting circuit 31 based on the control signals from the discriminating circuit 35C of the road surface condition discriminating circuit 35 as indicated by dashed and arrow lines in FIG. 6

Figure 7:
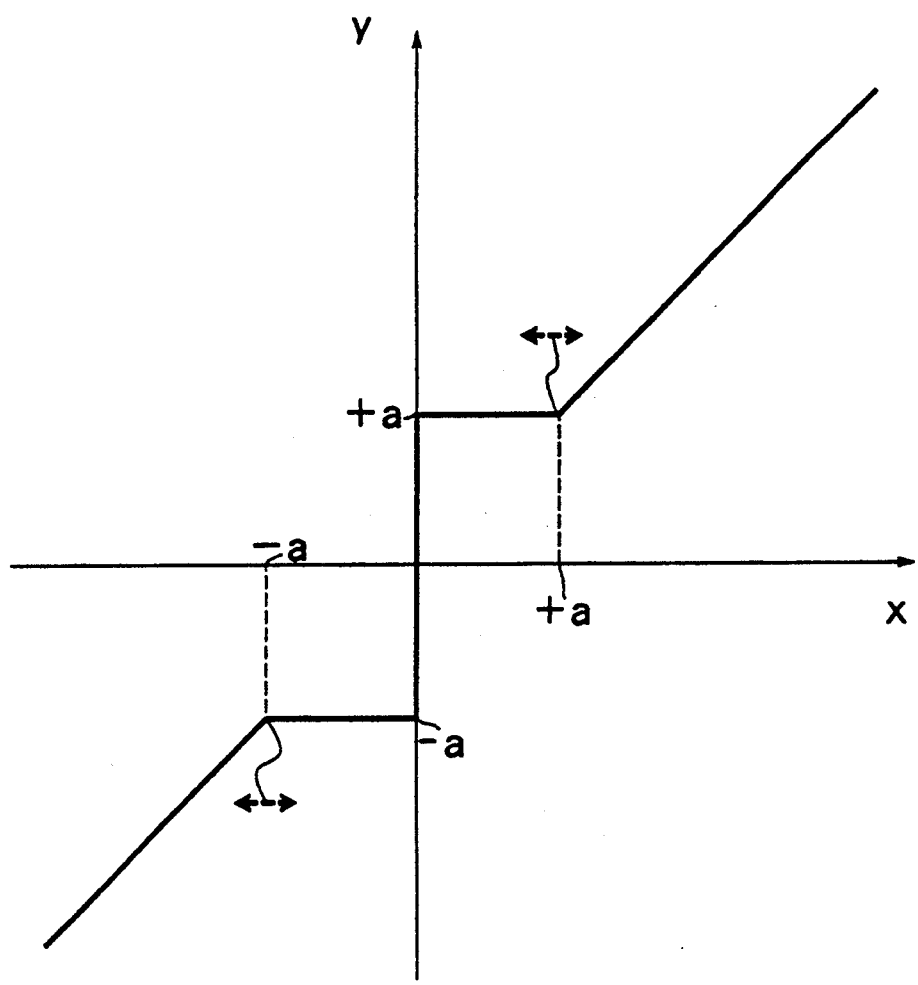
FIG. 7 is a diagrammatic view showing a dead zone of the velocity difference between a sprung velocity and its relative velocity.

The second dead zone setting circuit 34 is employed to set a dead zone value taking a constant value with its plus or minus polarity within the dead zone having a width controlled by the controlled signals from the discriminating circuit 35 in the road surface condition discriminating circuit 35 in the velocity difference between the weighted relative velocity and sprung velocity generated by the first and second mode converting circuits 31 and 32 as indicated by dashed lines in FIG. 7.

The second dead zone setting circuit 34 is employed, in the dead zone where a dead zone corresponded to a road surface condition in the velocity difference between weighted the relative velocity and sprung velocity generated by the first and second mode-converting circuits 31 and 32 and its relative velocity is set, to switch a constant control value with its plus polarity (a) to a constant control value with its minus polarity ($-a$) or a constant control value with its minus polarity to a constant control value with its plus polarity as an output signal as shown in FIG. 7.

Figure 8:
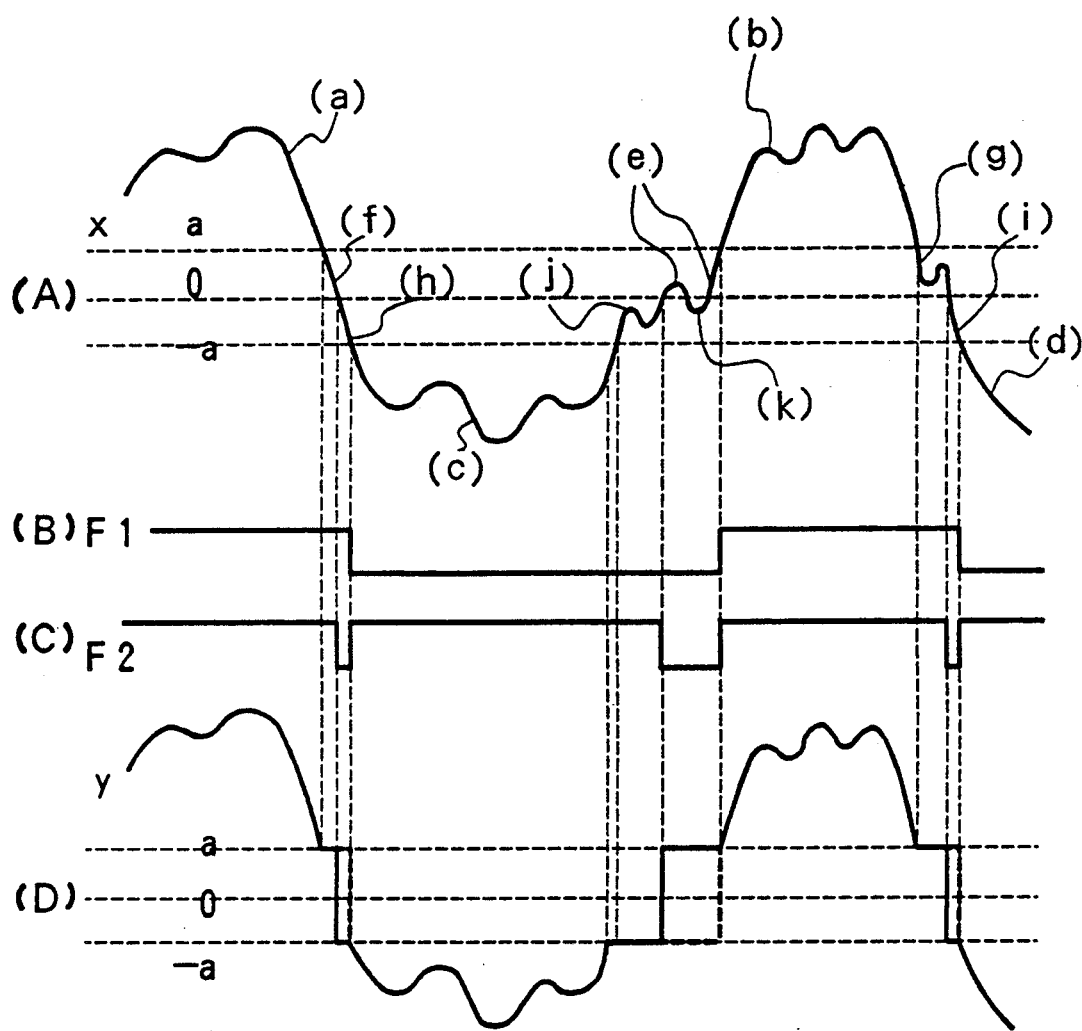
FIG. 8 is a diagrammatic view showing a relation between the input and output signals in a dead zone setting circuit.
Figure 9:
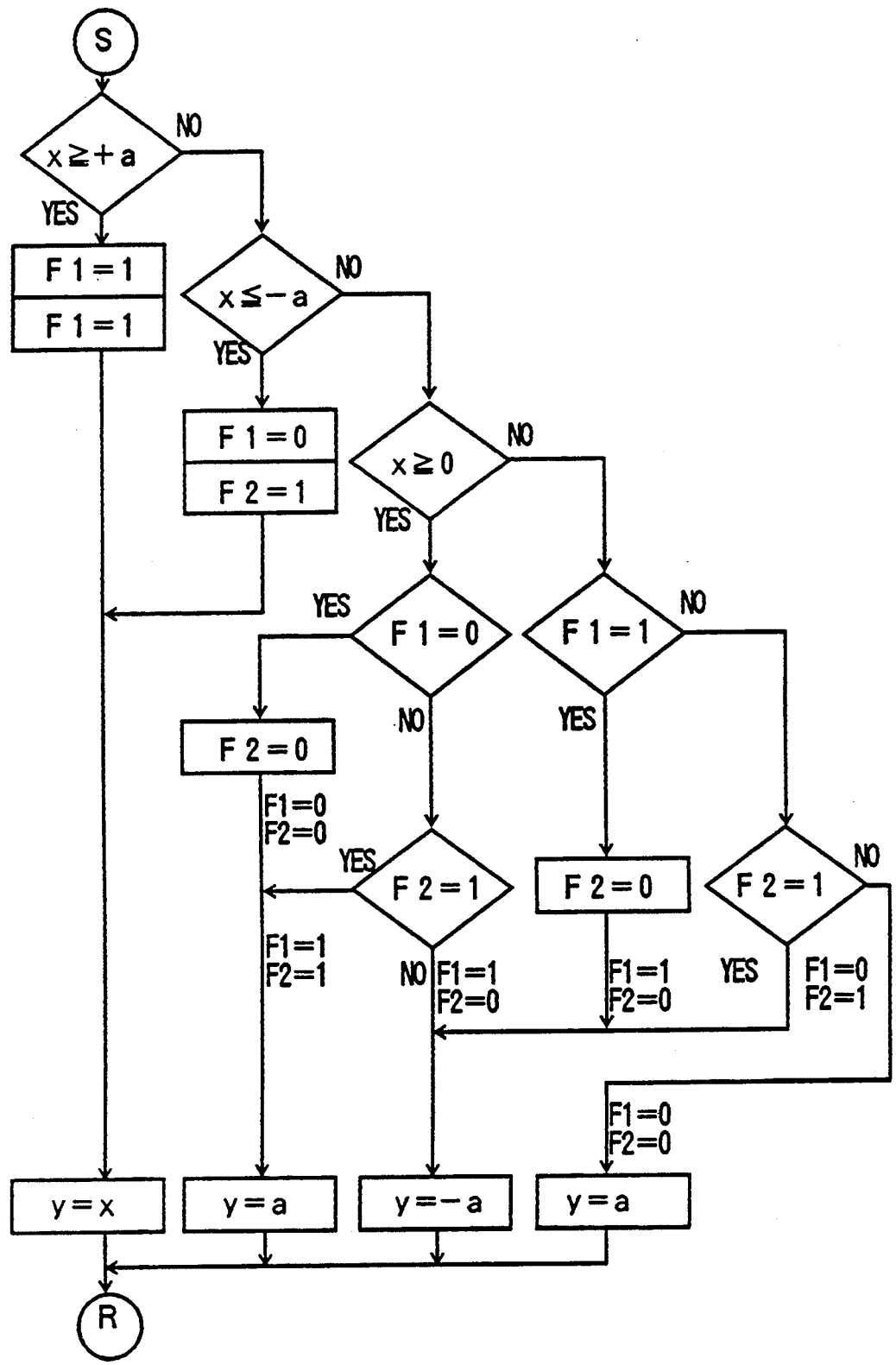
FIG. 9 is a flowchart showing a dead zone setting flow in a dead zone setting circuit.

Now, the detailed description of the logic for the dead zone setting described above will be given in the following. As shown in FIGS. 8 and 9, when an input signal x as a velocity difference between the sprung velocity input in the second dead zone setting circuit 34 from the first and second mode-converting circuits 31 and 32 and the relative velocity is larger than a plus boundary value of the dead zone determined by a control signal from the road surface condition discriminating circuit 35 (i.e., (a) and (b) in FIG. 8), a first flag F1 and a second flag F2 are both equal to 1 which have two pulse wave forms. When the input signal x is smaller than a minus boundary value ($-a$) of the dead zone described above (i.e., (c) and (d) in FIG. 8), the first and second flags F1 and F2 become zero and 1, respectively. In the two cases described above, the output signal y is equal to the input signal x (i.e., y=x).

When the input signal x has a larger plus value than zero and the first flag F1 is zero, the second flag F2 becomes zero (i.e., (e) in FIG. 8). When the first flag F1 is not zero in addition of this case and in the case that the second flag F2 is 1 (i.e., (f) and (g) in FIG. 8),the output signal y has a plus boundary value (a) in any cases (i.e., y=x).

When the input signal x has a minus smaller value than zero and in the case that the second flag F2 is zero when the first flag F1 is zero (i.e., (h) and (i) in FIG. 8), and also when the first flag F1 is not 1 and in the case that the second flag F2 is 1 (i.e., (j) in FIG. 8), the output signal y has a minus boundary value ($-a$) in either of the cases (i.e., y=$-a$). Also, when the input signal x has a larger plus value than zero and when the first flag F1 is not zero and the second flag F2 is not 1, the output signal y has a minus boundary value ($-a$) (i.e., y=$-a$).

When the input signal x has a minus smaller value than zero and when the first flag F1 is not 1 and the second flag F2 is not 1 also (i.e., (k) in FIG. 8), the output signal y has a plus boundary value (a) (i.e., y=a).

As evident from the above description, when an input signal indicated by x in FIG. 8(A) is inputted to the dead zone setting circuit 34, a dead zone is set up to give an output signal indicated by solid line y in FIG. 8(D).

The velocity ratio circuit 36 calculates each target damping force by dividing both a sprung velocity set up for the dead zone having its width controlled depending upon each road surface condition by means of the first and second dead zone setting circuits described above when its polarity is inverted and its relative velocity.

In other words, supposing that a sprung member having a mass m is supported to a unsprung member by both a spring having a spring coefficient K and an absorber having a damping coefficient C, the equation of motion for the sprung member is represented by Equation 1 in the following.

Equation 1

$$m\ddot{x} + C(\dot{x}-\dot{x}_0) + K(x-x_0) = 0$$

In the case of the "so-called sky hook damper" which employs an absorber having a damping coefficient C' of sky hook, the equation of motion for the sprung member is represented by Equation 2 in the following.

Equation 2

$$m\ddot{x} + C'\dot{x} + K(x-x_0) = 0$$

Therefore, if a damping coefficient C is arranged to satisfy such a relation as represented by the following equation by the Equations 1 and 2 even in actual suspension mechanism, it enables us to constitute a sky hook damper.

Equation 3

$$C = \frac{\dot{x}}{\dot{x} - \dot{x}_0} \times C'$$

Therefore, the velocity ratio circuit 36 described above is employed to calculate each velocity ratio according to Equation 3.

The gain circuit 37 is employed to control each gain by multiplying a target damping force on the basis of the velocity ratio generated by the velocity ratio circuit 36 with the sky hook gain signal generated by the road surface condition discriminating circuit 35.

The maximum value circuit 39 is employed to compare a target damping force multiplied with a sky hook gain to a stepwise target damping force generated by the vehicle speed circuit 38 based on the dimension of a vehicle speed signal and output the target damping force multiplied with the larger sky hook gain, e.g.

The actuator 4 comprises a drive circuit 41 for amplifying a control signal from the maximum value circuit 39 in the controller 3; and a drive unit 42 for controlling the opening area of a variable throttle mechanism 53 for determining a damping force by a drive signal from the drive circuit 41.

Figure 10:
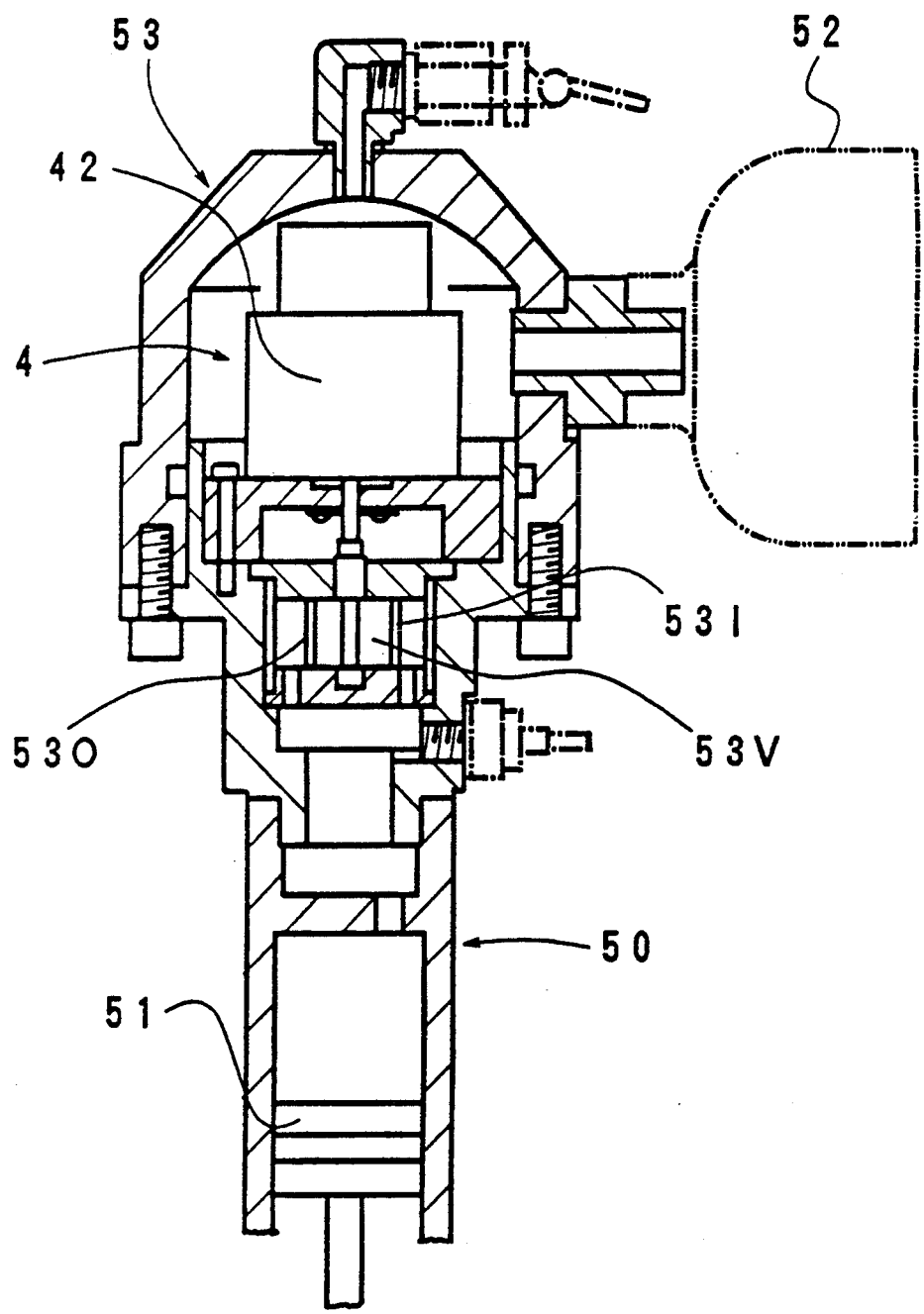
FIG. 10 is a sectional view showing an actuator in the apparatus of the first preferred embodiment.

The drive unit 42 is constituted by being disposed between a cylinder piston apparatus 51 of the absorbers 50A through 50D in the suspension mechanism for each wheel and an accumulator 52 as shown in FIG. 10, and integrated with a valve member 53V in the variable throttle mechanism 53 arranged within the main body of a case and by varying its positional relation to an orifice 53O formed so that its opposing interval to an inner cylinder 53I in a peripheral direction may vary due to the rotation of the valve member 53V, resulting in controlling the opening area.

Figure 3:
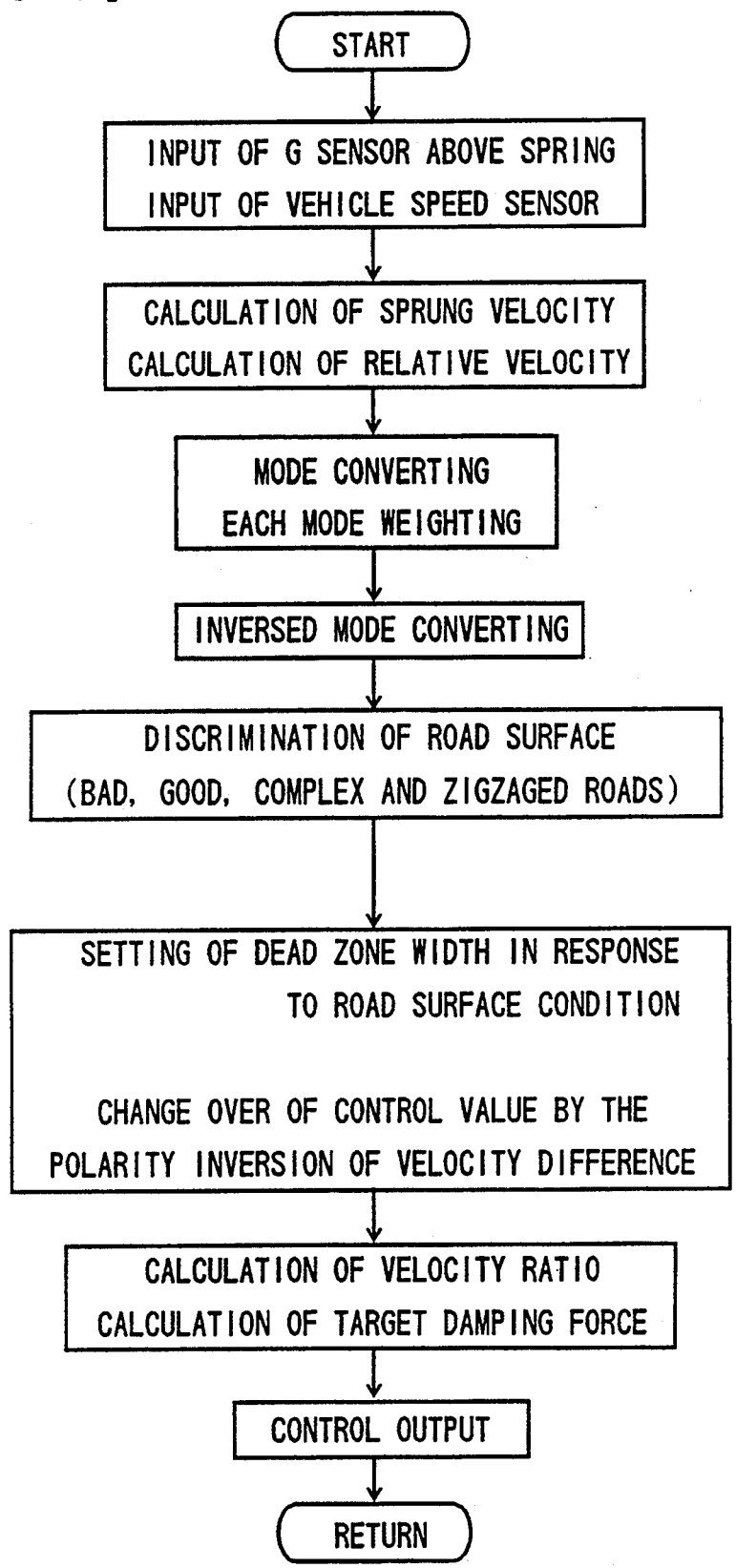
FIG. 3 is a flowchart diagram showing a main control flow of the apparatus of the first preferred embodiment.

The suspension control apparatus of the first preferred embodiment composed by the constitution above described detects a sprung acceleration by the acceleration sensors 10A, 10B and 10C as shown in FIG. 3, also detects a vehicle speed by the displacement sensors 20A through 20D, measures a sprung velocity from the integration of the sprung acceleration by a sprung measuring means, also measures a relative velocity from the differentiation of the vehicle speed by a relative velocity measuring means, carries out each mode-converting for heave, pitch, roll or warp by the first and second mode-converting circuits 31 and 32 so as to weight each component, converts each weighted component into each weighted sprung velocity by the inverted mode-converting, generates dead zone width control and sky hook gain signals by discriminating either case of bad, good, complex and zigzagged roads in the respect to the road surface condition by a road surface condition discriminating circuit 35, sets up a dead zone having its width on the basis of the dead zone width control signal by the first and second setting circuits 33 and 34, while the dead zone for changing over a control value being set up as described above when its polarity is inverted in terms of the velocity difference between the sprung velocity and the relative velocity and calculates a velocity ratio by dividing a sprung velocity set up for a dead zone having its width corresponded to a road surface condition by the velocity ratio circuit 36 by the difference between the sprung velocity and the relative velocity, resulting in obtaining a target damping force.

The suspension control apparatus of the first preferred embodiment achieves a target damping force of the absorber 50 by multiplying a target damping force with a sky hook gain corresponded to a road surface condition by the gain circuit 37, comparing this to a stepwise target damping force generated by the vehicle speed circuit 38 through the maximum value circuit 39 to output the larger target damping force as a control signal, amplifying the control signal by the drive circuit 41 of the actuator 4 to output a drive signal and rotating the valve member 53V of the variable throttle mechanism 53 by this drive signal to control the opening area, respectively.

The suspension control apparatus of the first preferred embodiment having the effect described above switches a control value y as an output signal from a plus constant value to a minus constant value when the polarity of the velocity difference x between a sprung velocity as an input signal and a relative velocity is inverted from plus to minus or from minus to plus by the dead zone setting circuit 34 as described above, and therefore, it has the effect that there is no delay in controlling in comparison with the prior art apparatus (as indicated by dashed line in FIG. 8) which does not change over the control value before the relative rate reaches the boundary value of the dead zone and that it is possible to prevent any shock because of the change over of the control value when the velocity difference is zero and also to prevent the generation of hunting indicated by (e) and (f) in FIG. 8.

The suspension control apparatus of the first preferred embodiment determines a dead zone value from the relation between the plus and minus polarities of the input signal x and the signal levels of the first and second flags F1 and F2 in the dead zone, and therefore, it has the effect that the setting of the dead zone is easy and certain.

Further, the suspension control apparatus of the first preferred embodiment controls the width of the dead zone in sprung velocity and relative velocity depending upon the road surface condition, that is: the width of the dead zone is narrowed in its good road and expanded in its bad road, and therefore, it has the effect of canceling such problems that unnecessary control is carried out in bad roads and necessary control is not carried out in good roads in similar to the prior art apparatus.

In the suspension control apparatus of the first preferred embodiment, the value within a dead zone is placed as zero within the dead zone in the sprung velocity constituting molecules of the velocity ratio described above and the value within the dead zone is defined as a plus or minus constant value. Therefore, the suspension control apparatus has the effect of preventing the velocity ratio from becoming limitless.

Furthermore, the suspension control apparatus of the first preferred embodiment make it possible to set a damping force corresponded to a road surface condition by multiplying a signal for determining a target damping force determined by the velocity ratio circuit 36 with a sky hook gain by the gain circuit 37 based on the discriminated results of the road surface condition and compare with each target damping force determined by the vehicle speeds to adapt the maximum value. Therefore, the suspension control apparatus has the effect of making it possible to set a target damping force by the vehicle speed in the advance of the setting of a target damping force by velocity ratio.

(The Second Preferred Embodiment)

Figure 12:
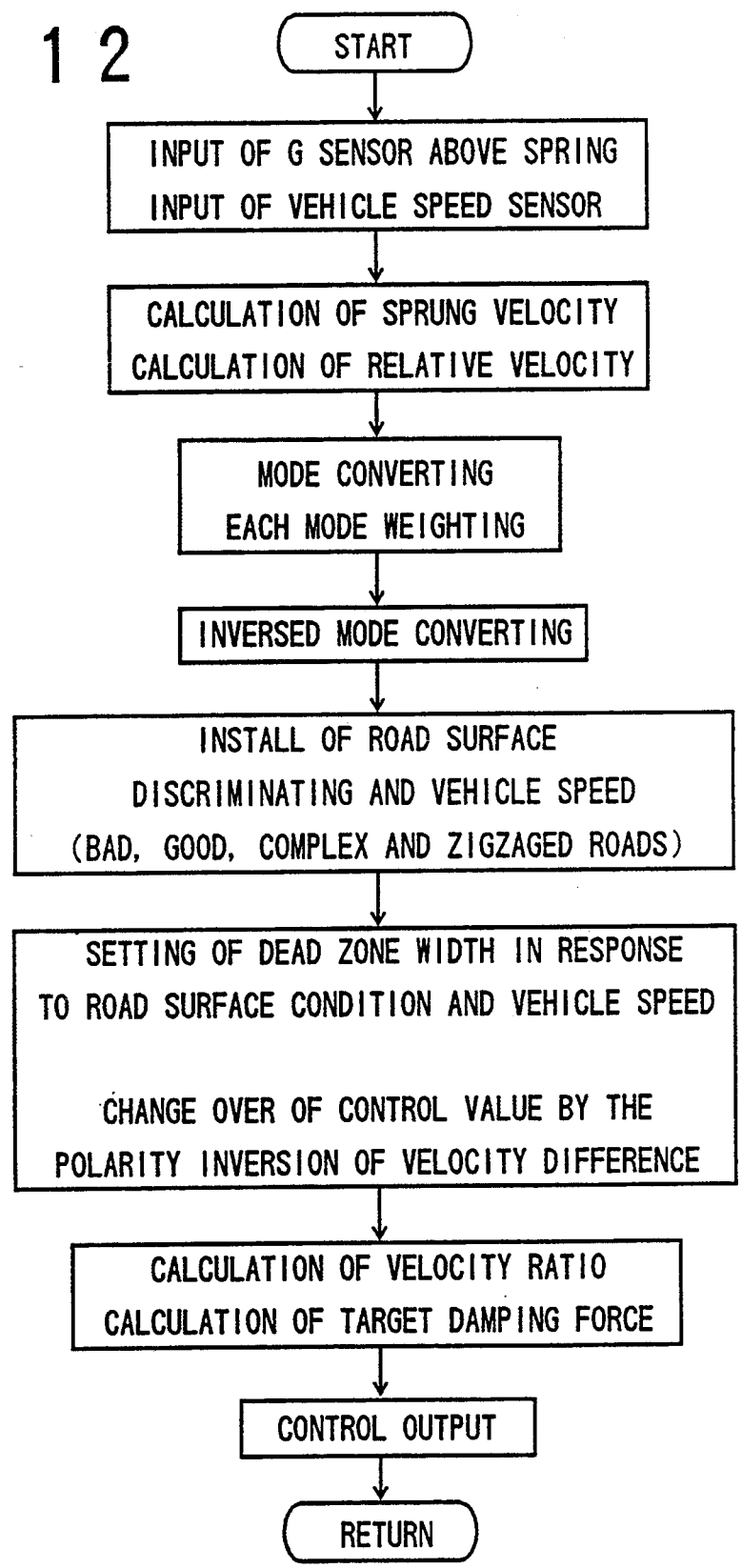
FIG. 12 is a flowchart showing a main control flow in the apparatus of the second preferred embodiment.
Figure 13:
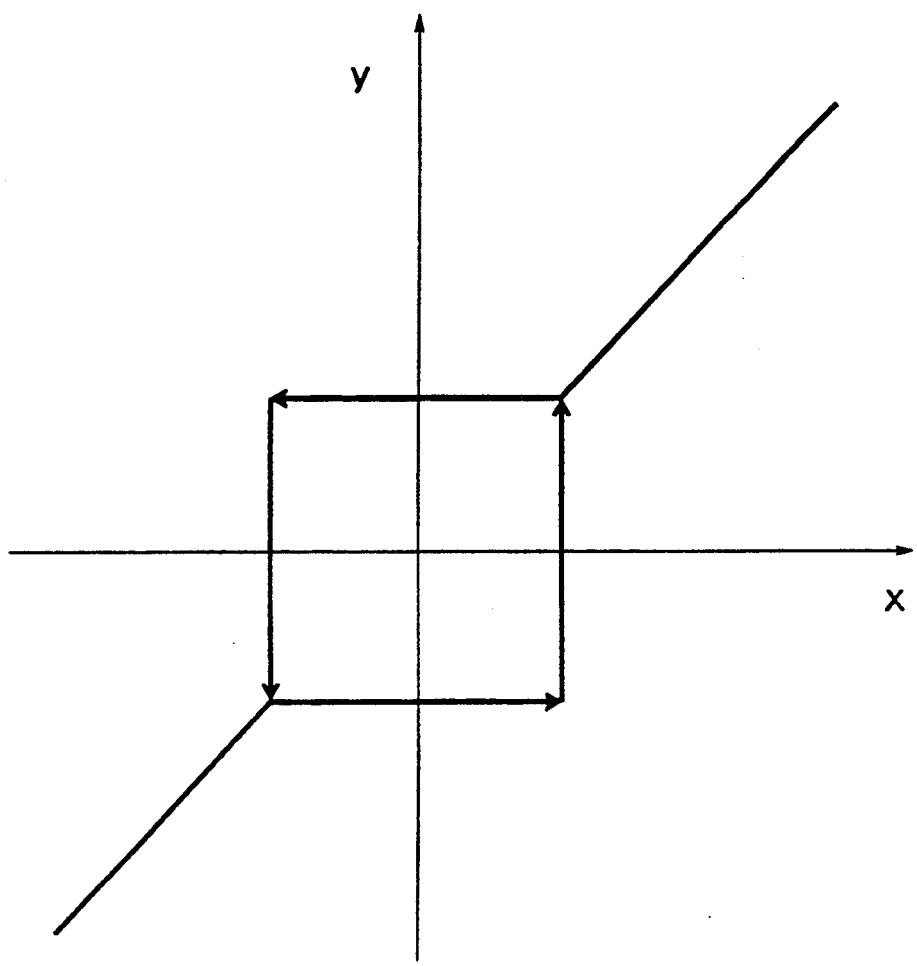
FIG. 13 is a diagrammatic view showing a dead zone in a prior art apparatus.

The suspension control apparatus of the second preferred embodiment is the same with the preferred embodiment described above excluding the point of controlling the widths of the dead zone in a sprung velocity and a relative velocity corresponding to both of the road surface condition and the vehicle speed as shown in FIGS. 11 and 12, and it has the action effect of making it possible to control the width of the dead zone if either the road surface condition or the vehicle speed outputs a control signal, and further to control a large dead zone corresponded to the both control signals if both the road surface condition and the vehicle speed output their control signal.

The first preferred embodiment described above explained an example for setting the dead zone of switching the control value if its polarity is inverted in the velocity difference between a sprung velocity and a relative velocity as one example. It should be understood, however, that the present invention is not restricted by this example and that other mode for setting the dead zone by changing over the control value if the polarity of the relative velocity is inverted is also adaptable.

The first preferred embodiment described above was explained as an example, and it is possible in the present invention to multiply with a sky hook gain based on a road surface condition and to compare a stepwise target damping force on the basis of a vehicle speed with a vehicle speed in the maximum value circuit.

The preferred embodiments described above are illustrated for explanation, and it is to be understood that the present invention should no be limited to those embodiments. Any modifications and additions are possible so long as the claims, the detailed description of the invention and the description of the drawings are not opposed to the technical concept of the invention appreciated by the same skilled persons.

What is claimed:

1. A suspension control apparatus, which is disposed between a wheel support member and a vehicle body, for controlling a damping force corresponding to a drive quantity by a drive mechanism, comprising:

a sprung velocity measuring means for measuring a sprung velocity;

a relative velocity measuring means for measuring a relative velocity between sprung and unsprung velocities; and a controller having a first dead zone setting circuit for setting a dead zone by changing over a control value when at least the polarity of an input signal representative of said relative velocity is inverted at a first time, and a circuit for calculating a velocity ratio between said sprung velocity and the relative velocity when said dead zone is set.

2. A suspension control apparatus according to claim 1, further comprising:

a second dead zone setting circuit for setting said dead zone according to the sprung velocity.

3. A suspension control apparatus according to claim 2, further comprising:

a first mode-converting circuit for mode-converting said relative velocity and inversely mode-converting the mode-converted relative velocity.

4. A suspension control apparatus according to claim 3, further comprising:

a second mode-converting circuit for mode-converting said sprung velocity and inversely mode-converting the mode-converted sprung velocity.

5. A suspension control apparatus according to claim 4, said first mode-converting circuit further comprising:

a first weighting circuit for properly weighting each mode of the mode-converted relative velocity.

6. A suspension control apparatus according to claim 5, said second mode-converting circuit further comprising:

a second weighting circuit for properly weighting each mode of the mode-converted sprung velocity.

7. A suspension control apparatus according to claim 6, further comprising:

a road surface condition discriminating circuit for discriminating a road surface condition based on an inversely converted and weighted relative velocity signal from said first mode-converting circuit; and for generating a signal controlling the dead zone widths of said first and second dead zone setting circuits.

8. A suspension control apparatus according to claim 7, further comprising:

a velocity ratio circuit for dividing a sprung velocity when said dead zone widths are controlled, respectively, depending upon the road surface condition by the velocity difference between the sprung velocity and the relative velocity, and calculating a target damping force.

9. A suspension control apparatus according to claim 8, further comprising:

a gain circuit for controlling a sky hook gain determining a target damping force depending upon the road surface condition generated from said road surface condition discriminating circuit.

10. A suspension control apparatus according to claim 9, further comprising:

a vehicle speed circuit for generating a stepwise target damping force depending upon a vehicle speed.

11. A suspension control apparatus according to claim 10, further comprising:

a maximum value circuit for outputting the larger target damping force from either the target damping force on the basis of the velocity ratio controlled in the sky hook gain outputted from said gain circuit or the target damping force generated from said vehicle speed circuit.

12. A suspension control apparatus according to claim 11, further comprising:

an actuator for controlling an opening area in a variable throttle mechanism disposed between a cylinder piston apparatus of an absorber in said suspension control apparatus and an accumulator based on the control signal from said controller.

13. A suspension control apparatus according to claim 12, wherein:

said sprung velocity measuring means comprises:

first to third acceleration sensors disposed respectively on sprung members of left and right front wheels and a left rear wheel;

a low pass filter for outputting only the components having their frequencies of 20 Hz or less within the acceleration signals detected by said each acceleration; and an integrator for giving a sprung velocity output from the integration of the output acceleration signal from said low pass filter;

14. A suspension control apparatus according to claim 13, wherein:

said relative velocity measuring means comprises:

first to fourth displacement sensors respectively comprising a potentiometer interposed between a sprung member and an unsprung member of each wheel;

a low pass filter for giving only component output having the frequencies of 20 Hz or less in the displacement signals detected by said each displacement sensor; and a differentiating circuit for differentiating the finite difference every a certain time of the displacement signals generated by said low pass filter and generating a relative velocity obtained by the above differentiation.

15. A suspension control apparatus according to claim 14, wherein:

said first mode-converting circuit comprises:

a first circuit being connected to said relative velocity measuring means and for mode-converting said relative velocity into each mode of heave, pitch, roll or warp;

a first weighting circuit for properly weighting each mode of heave, pitch, roll or warp; and a first inverted mode-converting circuit for inversely mode-Converting each mode component of the weighted heave, pitch,roll and warp and outputting a weighted relative velocity.

16. A suspension control apparatus according to claim 15, wherein:

said second mode-converting circuit comprises:

a second circuit being connected to said sprung velocity measuring means and for mode-converting of the sprung velocity into each mode of heave, pitch, roll or warp;

a second weighting circuit for properly weighting each mode of heave, pitch, roll or warp and a second inverted converting circuit for inversely mode-converting each mode component of respectively weighted heave, pitch, roll or warp and outputting a weighted sprung velocity.

17. A suspension control apparatus according to claim 16, wherein:

said road surface condition discriminating circuit comprises:

a low pass filter for outputting the component having frequencies of 3 Hz or less from the mode component output of heave of relative velocity generated by said first circuit in said first mode-converting circuit;

a high pass filter for outputting the component having frequencies of 3 Hz or more from the mode component output of heave of relative velocity generated by said first circuit; and a discriminating circuit for discriminating the road surface condition by counting the number of times when exceeding a set threshold, respectively, and generating a signal controlling the dead zone width and a sky hook gain signal.

18. A suspension control apparatus according to claim 17, wherein:

said first dead zone setting circuit sets a dead zone having a plus or minus constant value within the dead zone having a width controlled on the basis of a control signal from said discriminating circuit in said road surface condition discriminating circuit to the velocity difference between the weighted relative velocity and sprung velocity generated from said first and second circuit.

19. A suspension control apparatus according to claim 18, wherein:

said first dead zone setting circuit sets a dead zone corresponded to the road surface condition in the velocity difference between the weighted relative velocity and sprung velocity generated from said first and second circuits and changes over an output signal from a plus or minus constant value to a minus or plus constant value when the polarity of an input signal is inverted in said dead zone.

20. A suspension control apparatus according to claim 19, wherein:

said second dead zone setting circuit sets a dead zone having a value of zero within the dead zone with a width controlled by road surface conditions and vehicle speeds based on the control signals from said discriminating circuit of said road surface condition discriminating circuit in the weighted sprung velocity generated by said second circuit.

21. A suspension control apparatus according to claim 20, wherein:

said velocity ratio circuit calculates a target damping force while obtains a velocity ratio by dividing a sprung velocity set for a dead zone having its controlled width depending upon a road surface condition from said first and second dead zone setting circuit by the velocity difference between the relative velocity and sprung velocity having the control signal changed over when the polarity thereof is inverted and a relative velocity.

22. A suspension control apparatus according to claim 21, wherein:

said actuator comprises:

a drive circuit for amplifying a control signal from said maximum value circuit in said controller; and a drive unit for controlling the opening area in said variable throttle mechanism determining a damping force by a drive signal from said drive circuit.

23. A suspension control apparatus according to claim 22, wherein:

said each acceleration sensor generates as an electric signal the strain accompanied by the motion of a weight corresponded to the acceleration applied by a strain gauge adhered to the portion close to one end of a vibrating piece, said weight being fixed to one end of said vibrating piece in a cantilever structure fixed at other end to a base of said each acceleration sensor, the acceleration of the right rear wheel being estimated from the acceleration signals from the sensors of said left and right front wheel and the left rear wheel.

24. A suspension control apparatus according to claim 23, wherein:

said each displacement sensor comprises a first member fixed at a top end thereof to said sprung member, a second member fixed at a bottom end thereof to said unsprung member and a rotary type potentiometer interposed between said first member and second member, and when the interval between said sprung member and the unsprung member is varied, the angular relation between said first and second members is varied and the contact position of the potentiometer is varied, wherein a relative displacement thereof is outputted as a voltage signal.

25. A suspension control apparatus according to claim 24, wherein:

said drive unit is disposed between the cylinder piston of absorber in the suspension mechanism for each wheel and said accumulator, integrated with the valve member in said variable throttle mechanism provided in the main body of a case and comprises such a constitution of controlling the opening area due to varying its positional relation to an orifice formed on the cylinder so as to vary the opposing interval in a circumferential direction by controlling the opening area by rotating said valve member.

* * * * *